United States Patent
Chapon et al.

(10) Patent No.: US 9,125,345 B2
(45) Date of Patent: Sep. 8, 2015

(54) WEB WRAP APPARATUS

(75) Inventors: Emmanuel Chapon, Velet (FR); Gresset Pascal, Pirey (FR)

(73) Assignee: DEERE & COMPANY, Moline, IL (US)

(*) Notice: Subject to any disclaimer, the term of this patent is extended or adjusted under 35 U.S.C. 154(b) by 764 days.

(21) Appl. No.: 13/234,288

(22) Filed: Sep. 16, 2011

(65) Prior Publication Data

US 2012/0240516 A1   Sep. 27, 2012

(30) Foreign Application Priority Data

Sep. 16, 2010 (EP) ..................... 10177113

(51) Int. Cl.
- A01F 15/12 (2006.01)
- A01F 15/07 (2006.01)

(52) U.S. Cl.
CPC ....... A01F 15/0715 (2013.01); *A01F 2015/072* (2013.01)

(58) Field of Classification Search
USPC ........... 53/397, 399, 409, 203, 204, 210–214, 53/216, 228, 232–234
See application file for complete search history.

(56) References Cited

U.S. PATENT DOCUMENTS

| | | | | |
|---|---|---|---|---|
| 3,590,907 A | * | 7/1971 | Vilen | 242/564.5 |
| 4,205,501 A | * | 6/1980 | Michels | 53/228 |
| 4,597,241 A | * | 7/1986 | Clostermeyer | 53/116 |
| 5,317,858 A | * | 6/1994 | Hanai | 53/451 |
| 6,029,420 A | * | 2/2000 | Tertilt et al. | 53/118 |
| 6,823,646 B2 | | 11/2004 | McClure et al. | |
| 7,322,167 B2 | * | 1/2008 | Chapon et al. | 53/389.2 |
| 8,601,770 B2 | * | 12/2013 | Paillet et al. | 53/389.3 |
| 2009/0272072 A1 | * | 11/2009 | Paillet et al. | 53/118 |

FOREIGN PATENT DOCUMENTS

| | | | |
|---|---|---|---|
| DE | 19720489 | 11/1998 | |
| EP | 0289091 | 11/1988 | |
| EP | 2229811 | * 3/2009 | A01F 15/07 |
| EP | 2044830 | 4/2009 | |

OTHER PUBLICATIONS

European Search Report, Apr. 13, 2011, 2 pages.

* cited by examiner

*Primary Examiner* — Christopher Harmon

(57) ABSTRACT

A web wrap apparatus is provided and has a brake device that exerts pressure on a roll of a web material. In order to exert pressure even after the web material is cut, the brake device is locked by a retainer once the web is separated and is released by a feeder, when moving from a home position to a web feed position.

2 Claims, 5 Drawing Sheets

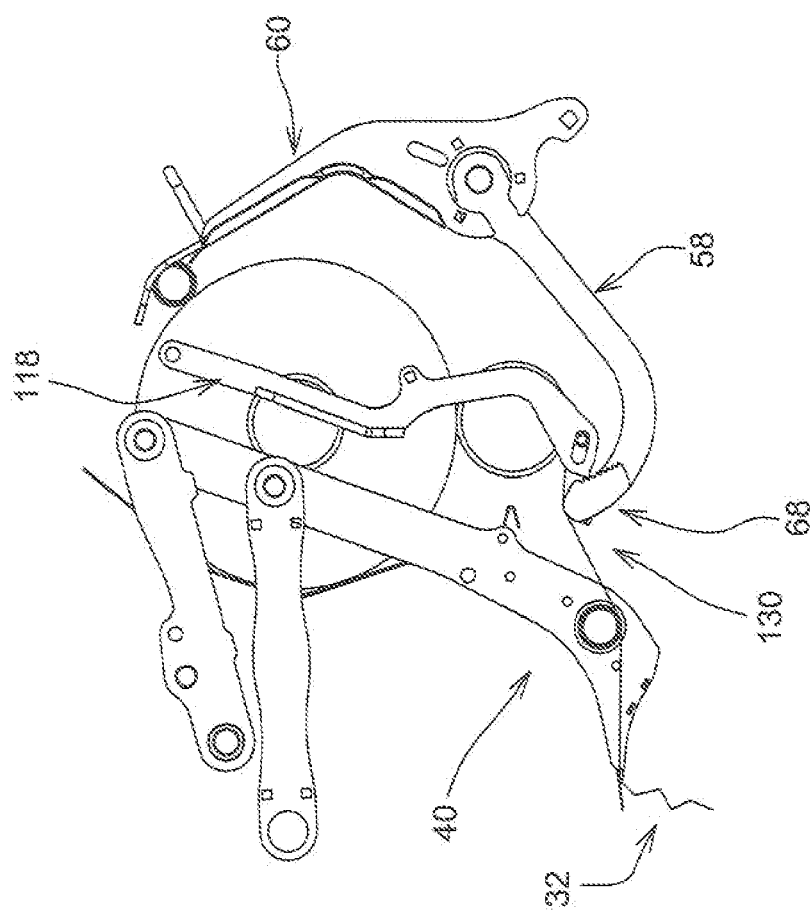
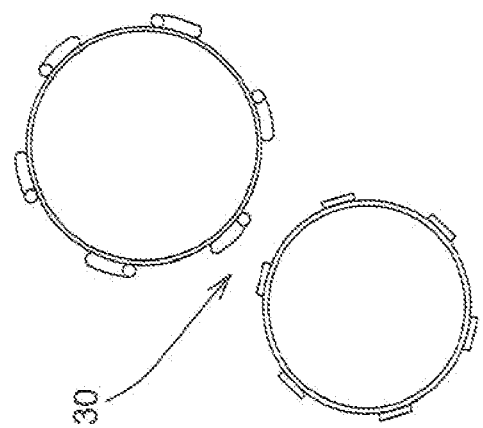
Fig. 5

WEB WRAP APPARATUS

FIELD OF THE INVENTION

This invention relates to a web wrap apparatus with a brake device acted upon by a web pulled by an article being wrapped, and having a feeder to transport the web.

BACKGROUND OF THE INVENTION

EP 2 044 830 A1 discloses a wrapping means tensioning device having a control arm and a brake arm, both being pivotally connected to one another and pivoting as a unit about an axis. The brake arm presses on a net roll to achieve a certain tension in the net during the wrapping process. The free end of the control arm is applied by the net and is deflected by it even more as the tension in the net increases. As a result, the pressing force onto the web roll will disappear, once the net is cut.

The problem this invention is based on is seen in the fact, that the net roll continues with its rotation even after the net is cut, which results in net being wound off the roll and being apt to create a net curl.

SUMMARY OF THE INVENTION

According to the invention the brake arm rests against the roll of web, even when the latter is cut and the brake device is no longer activated by the web. The force applied by the brake device does not necessarily need to remain at the highest level, but be at least sufficient to hinder the web roll from further rolling. The retainer may be a mechanical lock as well as a powered device like a motor, a solenoid activated clutch, lock, etc. The feeder may be of any type, like a duckbill, feed roller(s), feeder comb, etc. The movement of the feeder to start the feeding process will be used to unlock the brake device and release the brake. In case the feeder has a built-in reservoir for the web, the brake may open later; the brake may open earlier as well, provided the web roll has stopped rolling.

If the retainer is in the form of a multi-position ratchet, one part of it being located on the brake device and one part on the feeder, the brake device may be locked not just in one position, but at the position of maximum brake force, which has been achieved by the brake device. The ratchet may be a toothed rod, arc, etc. and a small driver entering the teeth.

In order to release the brake device, a lever, linkage, Bowden cable or the like may be used, which is activated by a movement of the feeder. A spring—mechanical or pneumatic—may force the lever into the locked position.

BRIEF DESCRIPTION OF THE DRAWINGS

The preferred embodiments of the invention will be described in detail below with reference to the accompanying drawings wherein:

FIG. 5 is the web wrap apparatus of FIG. 1 depicted in a partly retracted position acting on a lever.

DESCRIPTION OF THE PREFERRED EMBODIMENT

Figure 1:
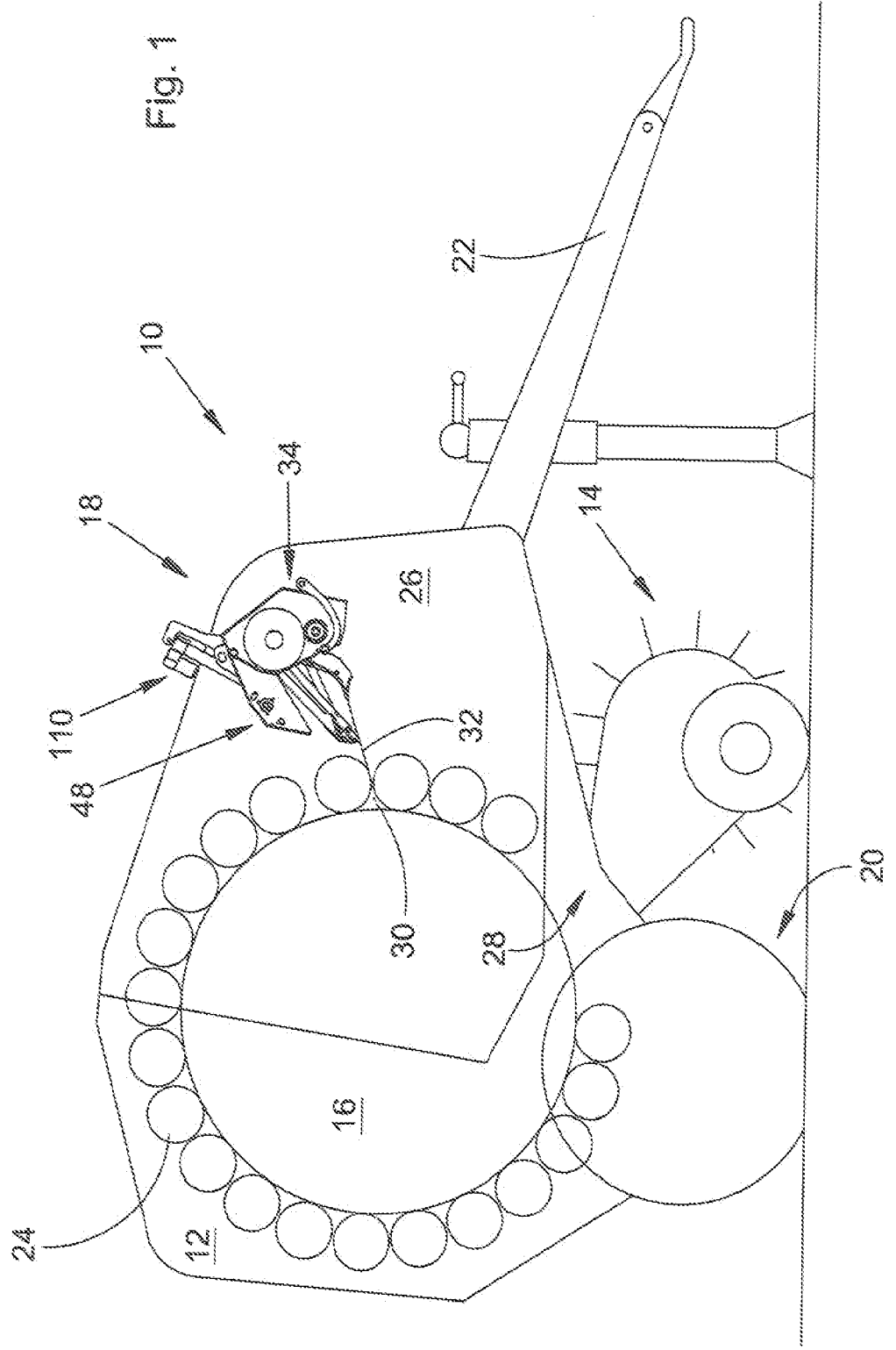
FIG. 1 is a round baler in schematic side view provided with a web wrap apparatus.

FIG. 1 shows around baler 10, which has a chassis 12, a pick-up 14, a bale chamber 16, a web wrap apparatus 18, an axle with wheels 20, a tongue 22 and baling elements 24.

The round baler 10 shown is of an ordinary fixed chamber design, but could also be a variable chamber design.

The chassis 12 rests on the axle with the wheels 20, carries the pick-up 14 and can be connected to a tractor or the like by way of the tongue 22. The chassis 12 has one or multiple part side walls 26, which are spaced apart from one another to receive between them the bale chamber 16, all or part of the web wrap apparatus 18 and the baling elements 24.

The pick-up 14 picks up crop from the ground and delivers it to the bale chamber 16 through a crop inlet 28 between the baling elements 24.

The bale chamber 16 is covered substantially by the baling elements 24 on the circumference and by the side walls 26 on the face sides. Beside the crop inlet 28 a gap 30 is provided between the baling elements 24, through which web 32 may be fed into the bale chamber 16. The bale chamber 16 serves to form a cylindrical bale of hay, straw or the like, which will be covered by the web 32 of plastic, net paper or the like. The baling elements 24 in this embodiment are in the form of steel rolls rotatably received in the sidewalls 26 and extending perpendicular to them. These baling elements 24 are arranged substantially on a circle.

Figure 2:
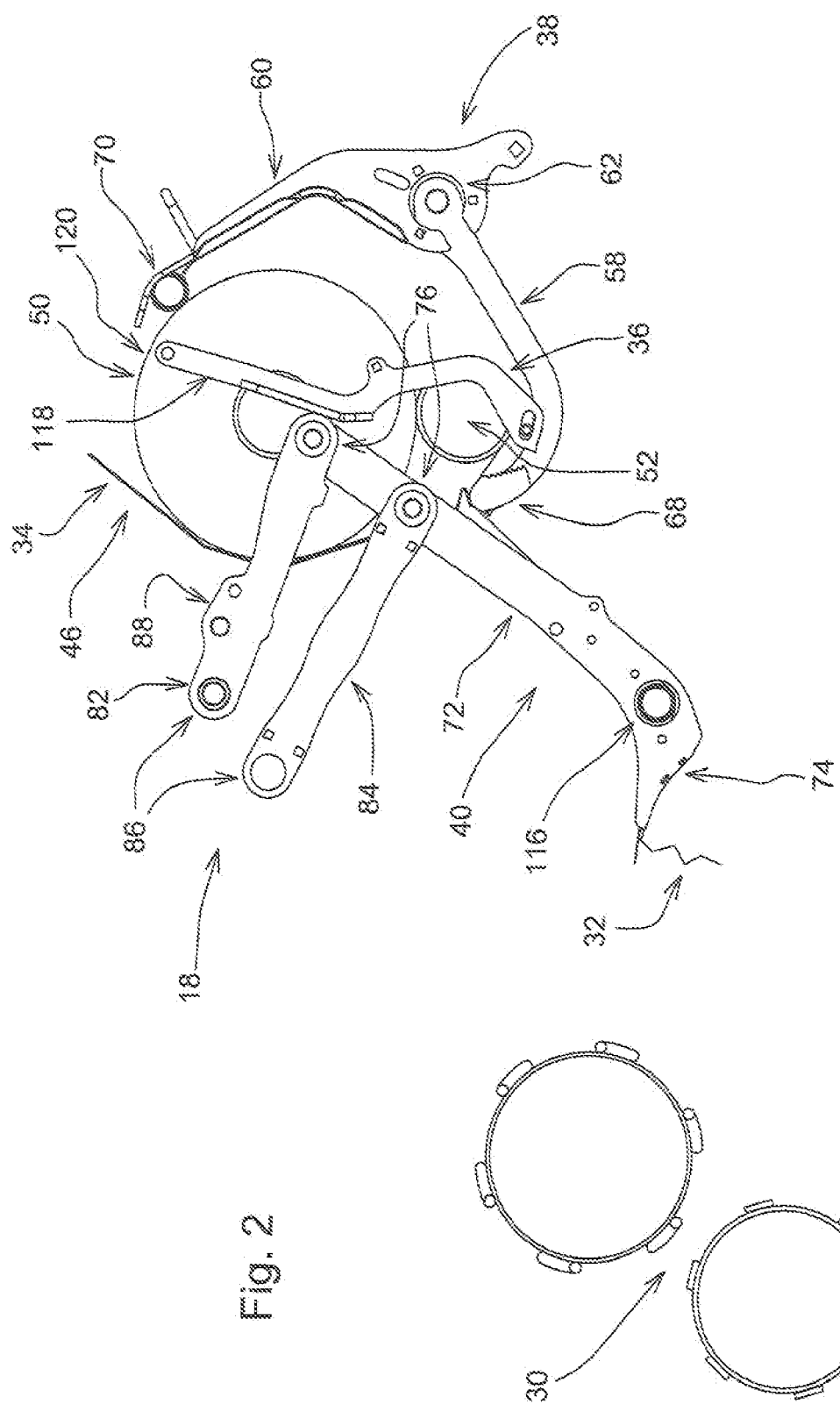
FIG. 2 is the web wrap apparatus of FIG. 1 depicted in a waiting position.

The web wrap apparatus 18 is visible in more detail in FIG. 2 and contains among other things a housing 34, a motion element 36, a brake device 38, a feeder 40 and a separator and an actuating mechanism (not shown). The latter are described in more detail in European Patent Appl. No. 09155481.6 filed on 18 Mar. 2009.

The housing 34 is located in the front upper part of the round baler 10 between or substantially between the side walls 26 and has a rear wall 46 and a left and a right wall 48 connected to one another and suitable to be connected to the side walls 26. Depending on the width of the web 32, the housing 34 and the entire web wrap apparatus 18 may extend beyond the side walls 26. The rear wall 46 may be of a material, or may have a layer, which creates a certain friction, which will have an influence on the rolling resistance of a roll 50 of the web 32. The housing 34 may be used to attach all components and parts of the web wrap apparatus 18 to it to form an autonomous unit. The right and left walls 48 extend to the rear towards the bale chamber 16 as needed to take up some of the parts described later.

The motion element 36 is formed by a roll 52, preferably rubber coated, which is journalled rotatably about a horizontal axis in the side walls 48 and which is located such that the roll 50 of the web 32 can rest on it. As is known in the art, but not shown here, the roll 52 is connected via a chain drive and a free-wheel to the baling elements 24 such that it must rotate slower than the baling elements 24.

The brake device 38 substantially has a control arm 58 and a brake arm 60 connected together on a shaft 62 to pivot about a horizontal axis of the latter. A gas spring (not shown) may be connected to the shaft 62 via an arm (not shown) to assist or resist the rotational movement of the shaft 62. It is the purpose of the brake device 38 to exert a certain pressure onto the roll 50 of the web 32 to assure a sufficient tension in it, when it is wrapped onto a bale (not shown). The shaft 62 is located at about the same height as the roll 52 and at a certain distance to it forwardly. The control arm 58 extends underneath the roll 52 and from a location rearward of the roll 52 to the shaft 62 and ends at about the center of the roll 52. The control arm 58 has an idler bar 68 or an angle extending parallel to the axis of the roll 52 between the side walls 48 of the web wrap apparatus 18. The brake arm 60 extends from the shaft 62 to a location above a completely wrapped roll 50 of the web 32 and has a cross element 70 designed to push onto the circumferential surface of the roll 50, thereby pressing the roll 50 against the rear wall 46 and creating the desired rolling resistance. As is apparent from the drawing, a downward, counter-clockwise movement of the control arm 58 will provoke a counter-clockwise movement of the brake arm 60 upon the roll 50 of the web 32.

The feeder 40 in this embodiment is formed as a so-called duckbill, which however is not mandatory; it could be any other moving part pulling the web 32 from the roll 50 and feeding it into the bale chamber 16 through the gap 30. The feeder 40 is composed of struts 72 on each side holding between them a carrier 74 in the form of a mouthpiece at a lower end thereof, two vertically distant bearings 76. The carrier 74 as such is known and has two opposite plates biased onto one another to clamp a piece of the web 32 and move it rearward. An upper link 82 and a lower link 84 forming part of a parallelogram linkage are connected with one end area to the bearings 76 and with their other end areas to the bearings 86 on the side walls 48 of the web wrap apparatus 18 being offset horizontally as well as vertically; lines through the bearings 76 at one end and the bearings 86 at the other end do not run parallel but divergently. The upper link 82 has an eye 88 on its upper side or a bore or the like useful to provide a connection to an actuator 110 such as an electric or hydraulic motor. An idler element 116 is connected to and connects the struts 72 on both sides. The idler element 116 assists in feeding the web 32 in a proper way into the carrier 74. The idler element 116 may consist of a simple bar or shaft.

The motor 110, which may be actuated electrically, hydraulically or pneumatically is connected with one side to the side walls 48 of the web wrap apparatus 18 or any other stationary feature of the chassis 12 and with the other side to the eye 88 on the upper link 82.

Figure 3:
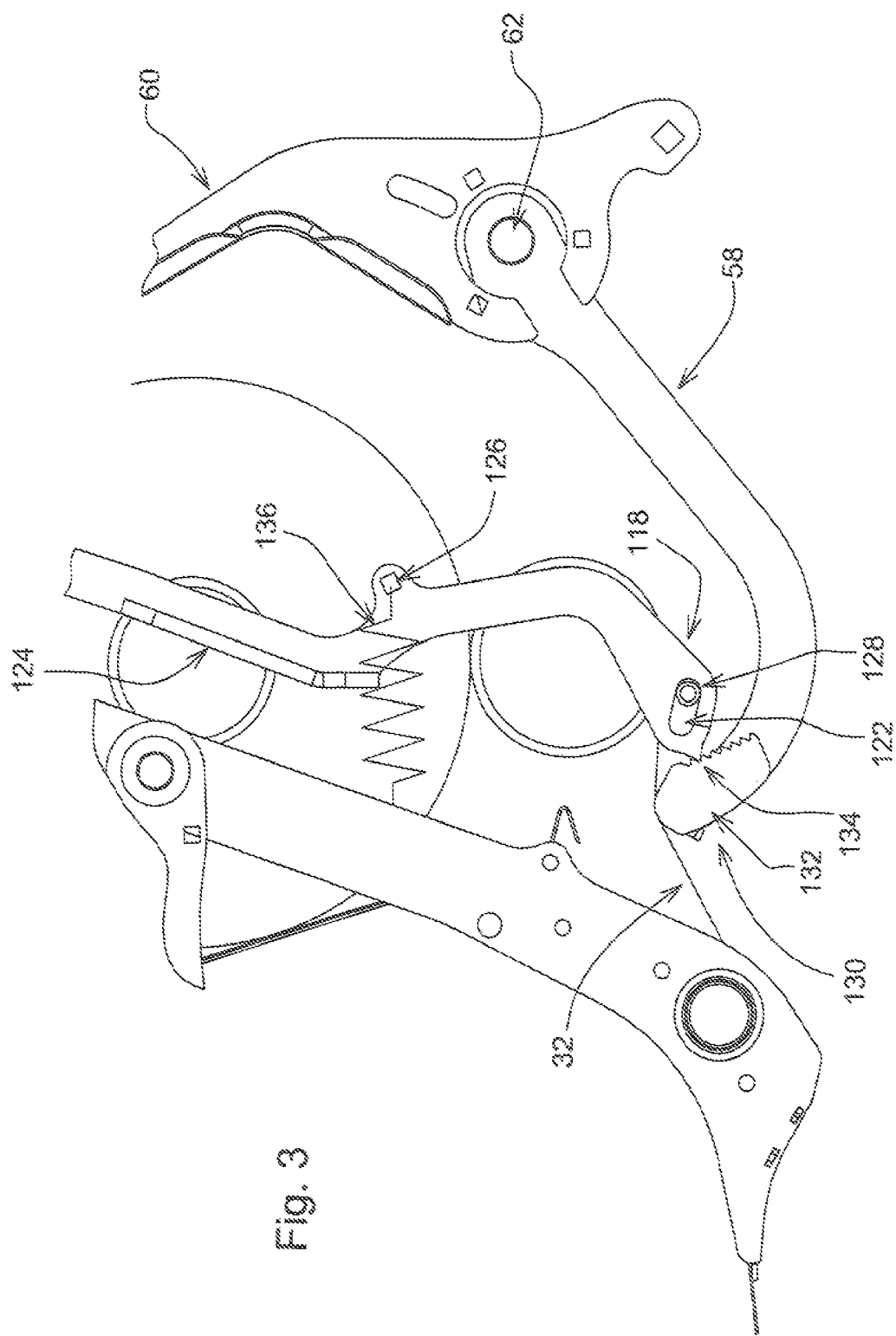
FIG. 3 is the web wrap apparatus of FIG. 1 depicted in a waiting position.

As is best seen in FIG. 3 a lever 118 is provided, with which an upper end area is journalled in a bearing 120 (see FIG. 2) in the wall 48 and which in its lower end area has a longitudinal slot 122 extending substantially on a circle about the bearing 120. Furthermore the lever 118 has a contact area 124 on the rear side and an aperture 126. The contact area 124 may be an angle or flat steel welded to the lever 118 and extending perpendicular to it. The lever 118 extends substantially vertically.

At the wall 48 a guide 128 is provided, which in a simple manner consists of a bolt, a bushing, a rod or the like, protruding through the slot 122 to limit the pivot movement of the lever 118 about the bearing 120.

A retainer 130 in the form of a ratchet is provided in an area, where the control 58 and the lever 118 make contact with one another. The retainer 130 has a first part 132 in the form of a toothed bar, cam or the like, wherein the teeth face towards the lever 118. The teeth are oriented and slanted downwardly to provide a good grip. A second part 134 of the retainer 130 is provided at the end of the lever 118 and has the form of a tooth, which may enter the space between two teeth on the first part 132. This second part 134 is oriented upwardly to engage securely in the first part 132.

Finally a spring 136 is installed between the aperture 126 and a location at the wall 48. The spring 136, which in this case is a coil tension spring, can be of any kind but needs to bias the lever 118 in a mating position of the first and the second part 132, 134, respectively.

While on either side one lever 118, one retainer 130 and one spring 136 would be sufficient it would be beneficial to have such a set on both sides of the round baler 10.

Based on this structural description the function is described as follows starting from a state shown in FIG. 2, in which the web wrap apparatus 18 waits to be operated. In a state as shown in FIG. 2, the roll 50 with the web 32 is placed on the roll 52 and is secured in its position between the cross element 70 and the rear wall 46. The feeder 40 is in a position remote from the gap 30. The web 32 extends from the roll 50, underneath the roll 52 over the idler bar 68, through the carrier 74, where it is clamped.

As soon as a manual or electrical signal is given to the actuating motor 110 to initiate wrapping the web 32 around a bale, the motor 110 is extended, thereby moving the feeder 40 downward and towards the gap 30. Once the carrier 74 protrudes the gap 30, the web portion hanging down from the carrier 74 is caught by the rotating bale and pulled from the roll 50. Tension is created in the web 32, since the roll 50 experiences friction on the wall 46 and since the roll 52 is hindered from free movement. FIG. 5 shows a situation, in which the motor 110 is retracted and thereby the feeder 40 is on its way back to a resting or home position.

FIG. 3 shows a situation, in which both parts 132, 134 are in a positive locking condition, whereas the control arm 58 is in a low position, which corresponds to the lowest position reached in the preceding wrapping cycle. The struts 72 are distant from the contact area 124 of the lever 118. Due to the connection between the control arm 58 and the brake arm 60, pivoting about the shaft 62, this location of the control arm 58 will exert considerable pressure on the web roll 50 through the contact with the cross member 70.

FIG. 2 shows the feeder 40 on its way to the gap 30 by pivoting about the bearings 86. During this downward movement the upper end of the struts 72 will hit the lever 118 in the contact area 124 and will push the lever 118 forward. The clockwise movement will disconnect the two parts 132, 134 of the retainer 130 and the assembly of the control arm 58 and the brake arm 60 is free to pivot upwardly either by the inherent bending forces in the brake device 38 and/or by the gas spring acting between the shaft 62 and the brake arm 60. The result is the position shown in FIG. 2.

Figure 4:
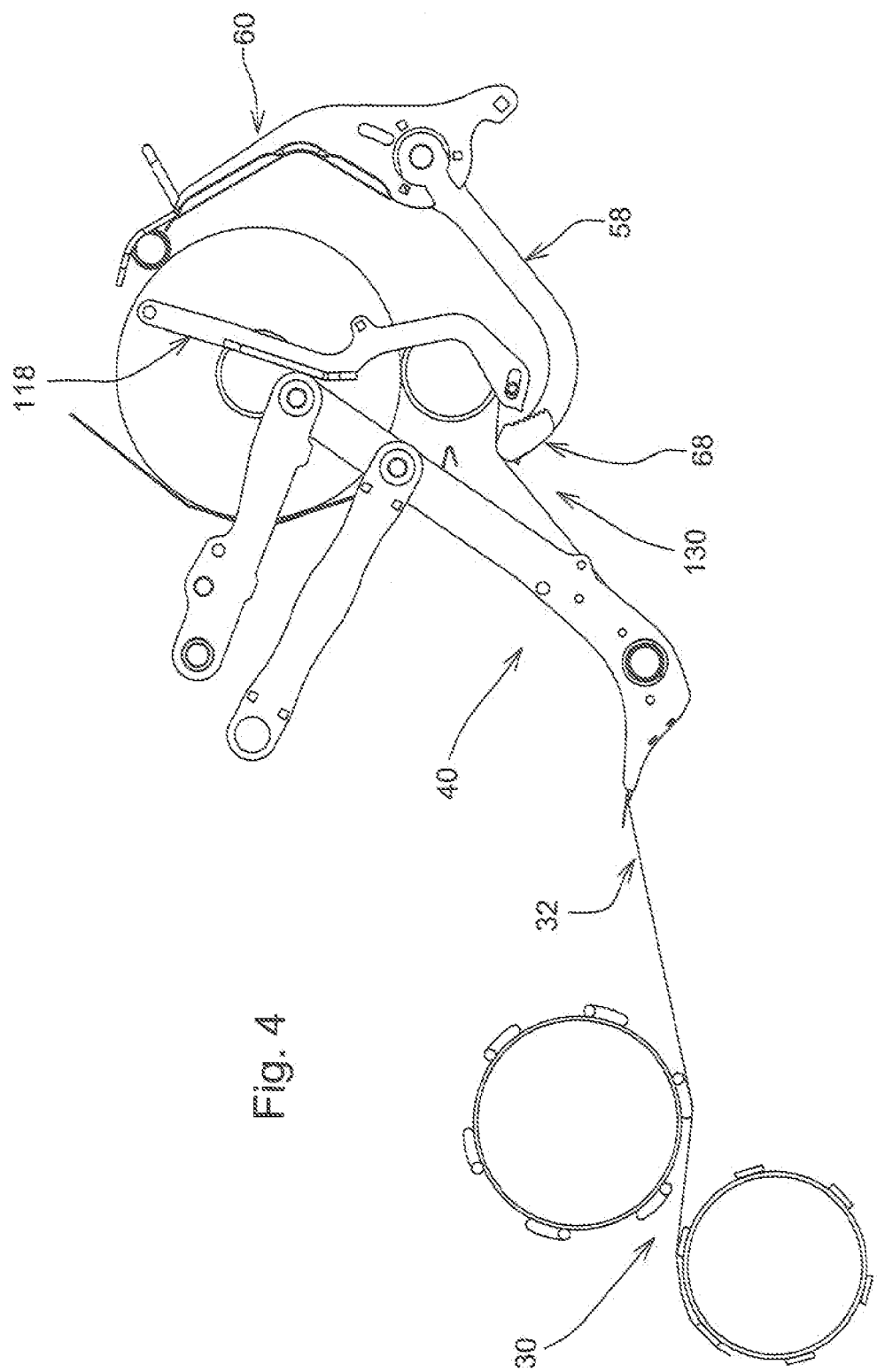
FIG. 4 is the web wrap apparatus of FIG. 1 depicted in a feeding operation on the way back to the waiting position.

FIG. 4 shows a situation, in which the web 32 is pulled by the bale in the bale chamber 16 and due to the tension in the web 32 the idler bar 68 is pushed down. Since at the same time the feeder 40 returns to its home position, the retainer 130 is disconnected, which at that time is no problem, since the tension in the web 32 still endures.

In FIG. 5 the feeder 40 has almost passed the lever 118, which then will again connect the two parts 132, 134 of the retainer 130 by virtue of the spring 136. When the web 32 is separated by a separator (not shown), the retainer 130 is locked and remains locked, until the wrapping cycle starts from the beginning.

Having described the preferred embodiment, it will become apparent that various modifications can be made without departing from the scope of the invention as defined in the accompanying claims.

The invention claimed is:

1. A web wrap apparatus comprising:
 a brake device acted upon by a web from a web roll pulled by an article being wrapped;
 a feeder to transport the web; and
 a retainer locking the brake device in one of a plurality of braking positions, each successive braking position exerting an increased pressure on the web roll, the brake device hindering the web roll from rolling and being releasable by a movement of the feeder prior to the web being pulled for a new wrapping operation, the retainer having the form of a multi-position ratchet, one part of which is located on the brake device and one part being actuated by the feeder, each position of the multi-position ratchet corresponds to an increased pressure on the web roll.

2. The web wrap apparatus according to claim 1, wherein the part of the retainer being actuated by the feeder is provided on a lever which is biased into a position by a spring and removed from the position by the feeder moving out of a home position.

\* \* \* \* \*